United States Patent
Choi et al.

(10) Patent No.: US 12,067,168 B2
(45) Date of Patent: Aug. 20, 2024

(54) METHOD AND APPARATUS FOR GENERATING AND MERGING IMAGE-BASED TEXTURE MOTION

(71) Applicant: POSTECH Research and Business Development Foundation, Pohang-si (KR)

(72) Inventors: Seung Moon Choi, Pohang-si (KR); Beom Su Lim, Pohang-si (KR); Sang Yoon Han, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 21 days.

(21) Appl. No.: 18/054,709

(22) Filed: Nov. 11, 2022

(65) Prior Publication Data

US 2023/0176653 A1 Jun. 8, 2023

(30) Foreign Application Priority Data

Nov. 12, 2021 (KR) .................. 10-2021-0155540
Nov. 4, 2022 (KR) .................. 10-2022-0146395

(51) Int. Cl.
*G06F 3/01* (2006.01)
*G06T 11/00* (2006.01)

(52) U.S. Cl.
CPC ............ *G06F 3/016* (2013.01); *G06T 11/001* (2013.01)

(58) Field of Classification Search
CPC .............................. G06F 3/016; G06T 11/001
See application file for complete search history.

(56) References Cited

U.S. PATENT DOCUMENTS

| 2011/0319180 A1 | 12/2011 | Lee | |
|---|---|---|---|
| 2015/0268725 A1* | 9/2015 | Levesque | G06F 3/041 345/156 |
| 2016/0171713 A1* | 6/2016 | Choi | G06T 11/60 382/103 |
| 2019/0311589 A1* | 10/2019 | Choi | G06F 3/016 |

FOREIGN PATENT DOCUMENTS

| EP | 2150057 | * | 3/2010 | ............... H04N 7/08 |
| JP | 2004294686 | * | 10/2004 | ............... G09B 9/06 |
| KR | 10-2007-0085589 A | | 8/2007 | |
| KR | 10-2011-0139614 A | | 12/2011 | |
| KR | 10-1608342 B1 | | 4/2016 | |
| WO | 2006/064010 A1 | | 6/2006 | |

OTHER PUBLICATIONS

Beomsu Lim, "Image-Based Texture Styling for Motion Effect Rendering", Department of Computer Science and Engineering Pohang University of Science and Technology, 2021, 94 pgs.
Beomsu Lim et al., "Image-Based Texture Styling for Motion Effect Rendering", VRST'21, Dec. 8- 10, 2021, 10 pgs.

* cited by examiner

*Primary Examiner* — Nelson M Rosario
*Assistant Examiner* — Scott D Au
(74) *Attorney, Agent, or Firm* — Sughrue Mion, PLLC (57) ABSTRACT

A method of providing a texture motion effect in a multi-sensory media system includes generating a texture signal by using linear predictive coding (LPC) filters obtained by applying LPC to each of a column and a row forming a texture image selected from an input image and generating a texture motion by using a visual roughness of the texture signal and a depth speed of a camera.

13 Claims, 6 Drawing Sheets

METHOD AND APPARATUS FOR GENERATING AND MERGING IMAGE-BASED TEXTURE MOTION

CROSS-REFERENCE TO RELATED APPLICATIONS

This application claims the benefit of Korean Patent Application No. 10-2021-0155540, filed on Nov. 12, 2021, in the Korean Intellectual Property Office, and No. 10-2022-0146395, filed on Nov. 4, 2022, in the Korean Intellectual Property Office, the disclosures of which are incorporated by reference herein in their entireties.

BACKGROUND

1. Field

The disclosure relates to a method of generating a motion effect in a multisensory media system. More particularly, the disclosure relates to a method of merging a texture motion effect with a camera motion effect.

2. Description of the Related Art

Multisensory media (mulse-media) improves a user's multimedia experience by providing various sensory effects, such as movement of a motion platform, vibration, wind, smell, etc., together with visual and auditory content. A motion platform technique was developed in early 1900's for a driving simulation and training and currently has been widely used for various entertainment purposes such as a ride of an amusement park, a four-dimensional (4D) movie, etc. The motion platform technique may increase immersion and reality by providing a motion sense matching a movement of a camera or a character in entertainment content.

According to the related art, experts manually manufacture a motion effect to match content by watching an image. However, this may incur a lot of time and expenses.

SUMMARY

Provided is a motion platform configured to provide a movement with respect to a texture of a road surface in content provided by a multisensory media system, according to an embodiment.

Provided is a fine texture effect, such as a sand field, a slippery road, a bumpy road, etc., further to a camera motion effect provided with respect to a movement of a predetermined object.

Additional aspects will be set forth in part in the description which follows and, in part, will be apparent from the description, or may be learned by practice of the presented embodiments of the disclosure.

According to an aspect of the disclosure, a method of providing a texture motion effect in a multisensory media system includes generating a camera motion synchronized with a movement of a camera of an input image, selecting a texture image from a scene to which a texture motion effect is to be added, generating a texture signal by using linear predictive coding (LPC) filters obtained by applying LPC to each of a column and a row forming the texture image, generating a texture motion by using a visual roughness of the texture signal and a depth speed of the camera, and generating a merged motion by merging the camera motion with the texture motion according to a model prediction control (MPC) method.

According to another aspect of the disclosure, a method of providing a texture motion effect in a multisensory media system includes generating a texture signal by using linear predictive coding (LPC) filters obtained by applying LPC to each of a column and a row forming a texture image selected from an input image and generating a texture motion by using a visual roughness of the texture signal and a depth speed of a camera.

The method may further include generating a merged motion by merging a camera motion synchronized with a camera movement of the input image with the texture motion.

The merged motion may be synthesized according to a model prediction control (MPC) method, and the method may further include controlling a motion platform based on the merged motion.

The input image may be a point of view (POV) shot.

A high frequency component that a motion platform is unable to display may be removed from the texture signal by using a bandpass filter.

The column may be mapped to a heave channel, and the row may be mapped to a roll channel.

According to another aspect of the disclosure, a motion effect rendering device includes a linear predictive coding (LPC) applier configured to obtain LPC filters by applying LPC to each of a column and a row forming a texture image selected from an input image, a bandpass filtering portion configured to remove a high frequency component of a texture signal generated by using the LPC filters, a scaler configured to scale the texture signal based on a visual roughness of the texture signal, and a re-sampler configured to generate a texture motion by using the scaled texture signal and a depth speed of a camera.

The motion effect rendering device may further include a compensator configured to compensate for a perceptual magnitude by scaling an amplitude of the texture motion.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

Hereinafter, an embodiment will be described in detail by referring to the accompanying drawings.

A multisensory media system may include a four-dimensional (4D) platform, a game platform, a virtual reality platform, etc. The 4D platform may be an immersive entertainment system configured to provide various physical effects, such as a motion, a vibration sense, wind, water, smell, etc., along with visual and auditory content. The 4D platform may improve a user's multimedia experience.

A "4D ride," which is an example of the multisensory media system, provides a first-person point of view (POV) image and a camera motion effect synchronized with a movement of a camera of an image. The "4D ride" is a type of 4D content providing a virtual riding experience in a vehicle for entertainment.

The multisensory media system provides a motion command in which a multi-degree of freedom motion of an object in an image provided by visual and auditory content is transformed and contracted according to a degree-of-freedom which may be achieved within an operating range of a motion platform. For example, a motion platform 7 may have a limited operating range, such as a rotation axis within 10 degrees, a translation axis within 5 cm. When the motion command is transmitted to the motion platform, a motion effect is reproduced.

An object may have a motion of 6 degrees of freedom in a three-dimensional (3D) camera space. However, depending on a degree of freedom (DoF) of a movable axis, the motion platform may represent a motion of 2 degrees of freedom, 3 degrees of freedom, 4 degrees of freedom, or 6 degrees of freedom. The 2 degrees of freedom provides roll and pitch. The 3 degrees of freedom provides roll, pitch, and heave. The 4 degrees of freedom provides roll, pitch, heave, and sway. The 6 degrees of freedom provides motions of all orientations.

Figure 1:
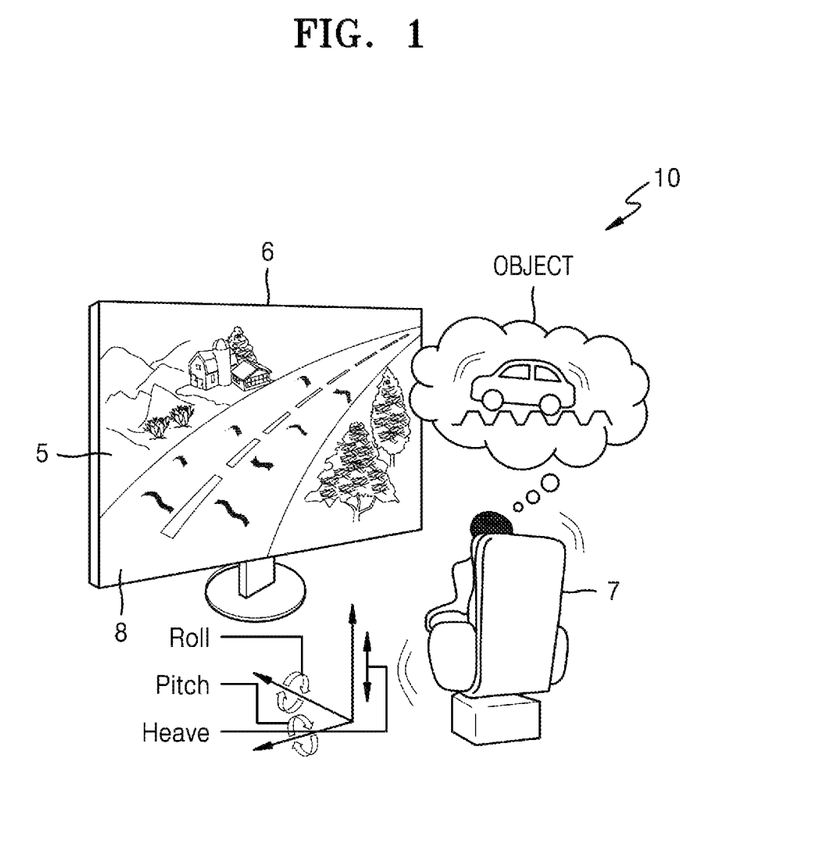
FIG. 1 illustrates a multisensory media system according to an embodiment.

FIG. 1 illustrates an example of a multisensory media system 10 configured to provide a motion effect by further reflecting a ground texture, such as a bumpy road, experienced by an object in an input image, according to an embodiment.

Referring to FIG. 1, the multisensory media system 10 may include a screen 6 displaying an image 5 and the motion platform 7. The screen 6 may include various types of displays. The motion platform 7 may also be known as a motion simulator.

According to an embodiment, the multisensory media system 10 may not manually provide a motion effect, but may automatically generate a motion effect in advance and may reproduce the motion effect synthesized with content reproduced on the screen 6.

Referring to FIG. 1, in addition to a camera motion effect according to a movement of an automobile 1, the multisensory media system 10 may provide a texture motion effect of a bumpy road when the automobile 1 crosses a brick road 8. A user may experience the reality and immersion as if the user actually drives an automobile on a brick road.

Figure 2:
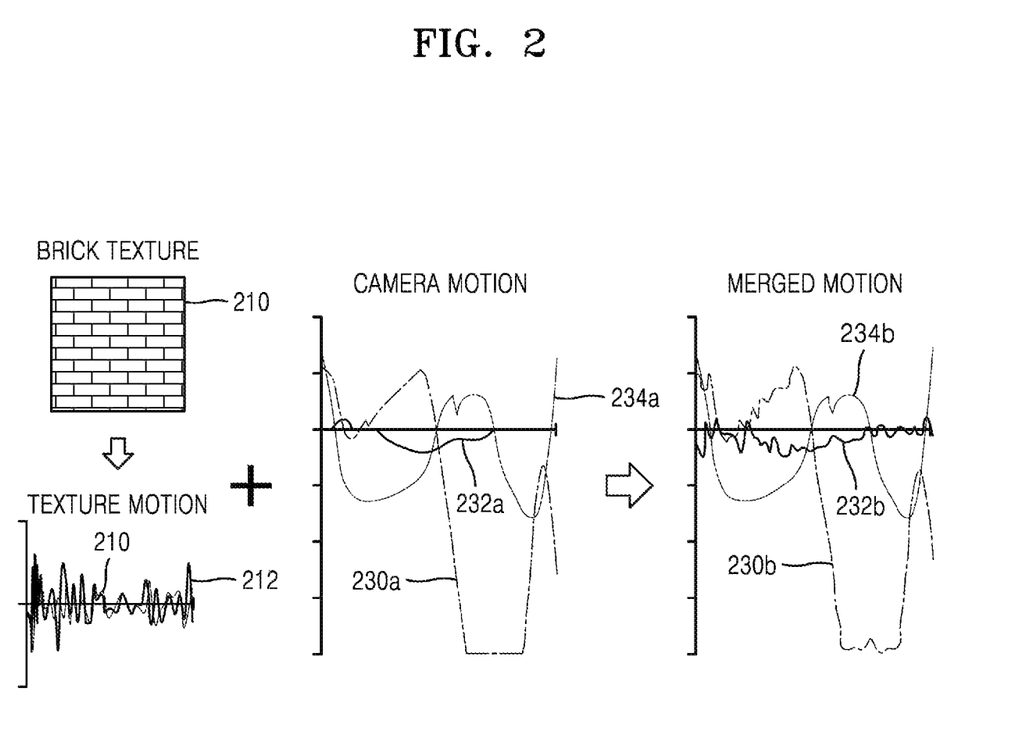
FIG. 2 illustrates an example of a merged motion used in a multisensory media system according to an embodiment.

Further referring to FIG. 2, the multisensory media system 1 may generate camera motions 230a, 232a, and 234a (FIG. 2) synchronized with a camera movement according to a movement of the object 1 in the image 5. Also, with respect to a scene 210 selected in advance, the multisensory media system 1 may generate merged motions 230b, 232b, and 234b in which the texture motion that is automatically generated is further reflected in the camera motion effect.

To this end, after the camera motion synchronized with the camera movement in the input image is generated, a scene to which the texture motion is to be added may be selected from an image sequence of the input image. The selecting of the scene to add the texture motion to may be performed by a user. Also, an area 8 to which the texture motion is to be assigned may be selected in the selected scene, and the texture motion may be generated. Also, the merged motion may be generated by merging the camera motion with the texture motion.

The multisensory media system 10 may transform, via a motion cueing algorithm (MCA), the merged motions 230b, 232b, and 234b indicating the movement of the object 1 in the image 5, to a contracted motion command which may be achieved within an operating range of the motion platform 7, and may transmit the motion command to the motion platform. The MCA may include a washout filter and a model predictive control (MPC) method, etc.

Figure 3:
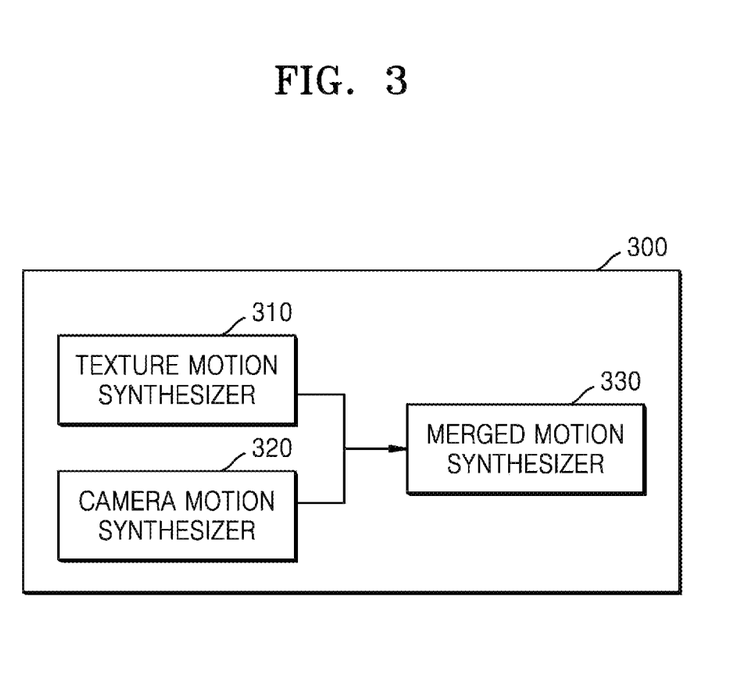
FIGS. 3 and 4 are diagrams illustrating structures of a motion effect rendering device for providing a texture motion effect, according to an embodiment.
Figure 4:
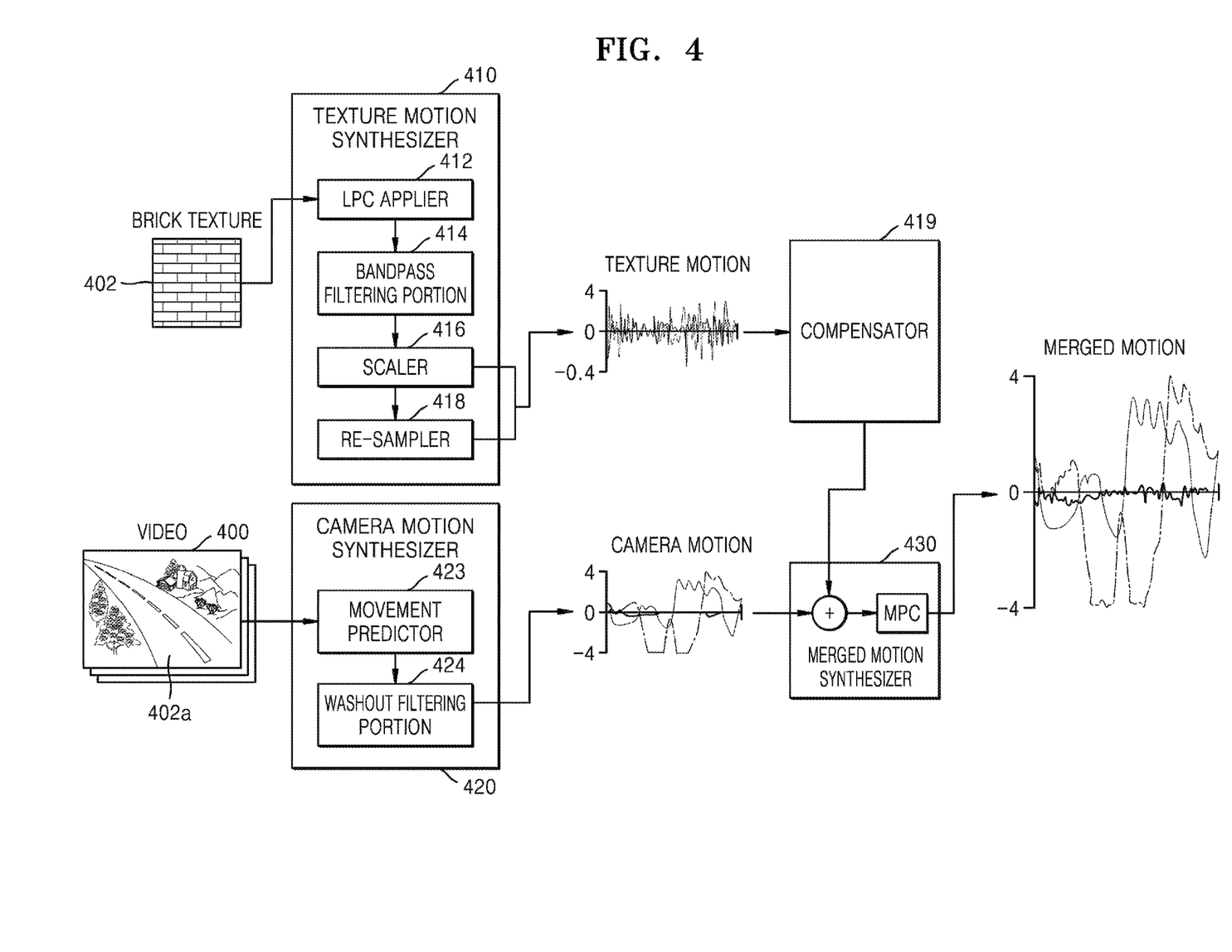

FIG. 3 illustrates a structural diagram of a motion effect rendering device 300 for providing a texture motion effect, according to an embodiment. FIG. 4 illustrates an example of a motion effect rendering device 400 according to an embodiment. In FIGS. 3 and 4, it is assumed that an input texture image is manually provided.

The motion effect rendering device 300 may include a texture motion synthesizer 310, a camera motion synthesizer 320, and a merged motion synthesizer 330.

The texture motion synthesizer 310 may generate a texture signal by using an LPC filter obtained by applying LPC to each of columns and each of rows of the texture image. Also, an excessively high frequency component that the motion platform is unable to display may be removed by bandpass-filtering the texture signal. Thereafter, as shown in an example of FIG. 6, the texture signal may be scaled based on a visual roughness of the texture signal. Also, the scaled texture signal may be re-sampled based on a depth speed of a camera to generate a texture motion of a texture image. According to the disclosure, the texture image may be a scene selected by a user from an image sequence of the input image. Alternatively, the texture image may be a predetermined area in the selected scene. The texture image may be automatically extracted from the input image by using a computer vision technique, such as bottom sensing or depth estimation. Alternatively, a user may use an arbitrary image as the texture image to match the selected scene. Referring to FIG. 4, a texture image 402 may be a predetermined area 402a of a selected scene 400 of an input image.

The camera motion synthesizer 320 may generate a camera motion in which the input image and a camera movement of the input image area synchronized with each other. The camera motion synthesizer 320 may detect a camera movement capturing an image and generate the camera motion corresponding thereto. When movement information of an object is stored by using a motion sensor capable of sensing a movement, during content manufacturing, the camera motion synthesizer 320 may use the pre-stored movement information. Also, in the case of the content manufactured through a simulation engine, such as a game or an animation, the camera motion synthesizer 320 may directly extract information with respect to a movement of an object from the simulation engine. Here, the simulation engine may include the unity 3D, the unreal engine, the Adobe Flash Player, etc. The camera motion synthesizer 320 may use a technique of automatically generating a camera motion based on an input image. In addition to these examples, the movement of the camera may be detected by using a computer technique of estimating the movement of the camera.

The merged motion synthesizer 330 may generate a merged motion by merging the camera motion generated by the camera motion synthesizer 320 with the texture motion generated by the texture motion synthesizer 310. The merged motion may be synthesized according to an MPC method, and the multisensory media system may control the motion platform based on the generated merged motion.

Each of components will further be described by referring to FIG. 4.

The texture motion synthesizer 410 may include an LPC applier 412, a bandpass filtering portion 414, a scaler 416, and a re-sampler 418.

The LPC applier 412 may consider columns and rows of the input texture image 402 as time series data indicating roughness information in a vertical direction and a horizontal direction, respectively. The columns may be mapped to an up and down translation movement motion command of a heave channel, and the rows may be mapped to a right and left rotation motion command of a roll channel. Also, after separating the texture image 402 into the columns and the rows, LPC may be applied to each column and each row to obtain LPC filters. The LPC filters may include row LPC filters obtained by applying LPC to the rows and column LPC filters obtained by applying LPC to the columns. Through this process, the LPC applier 412 may change the texture image 402, which is spatial data, to temporal data.

Figure 5:
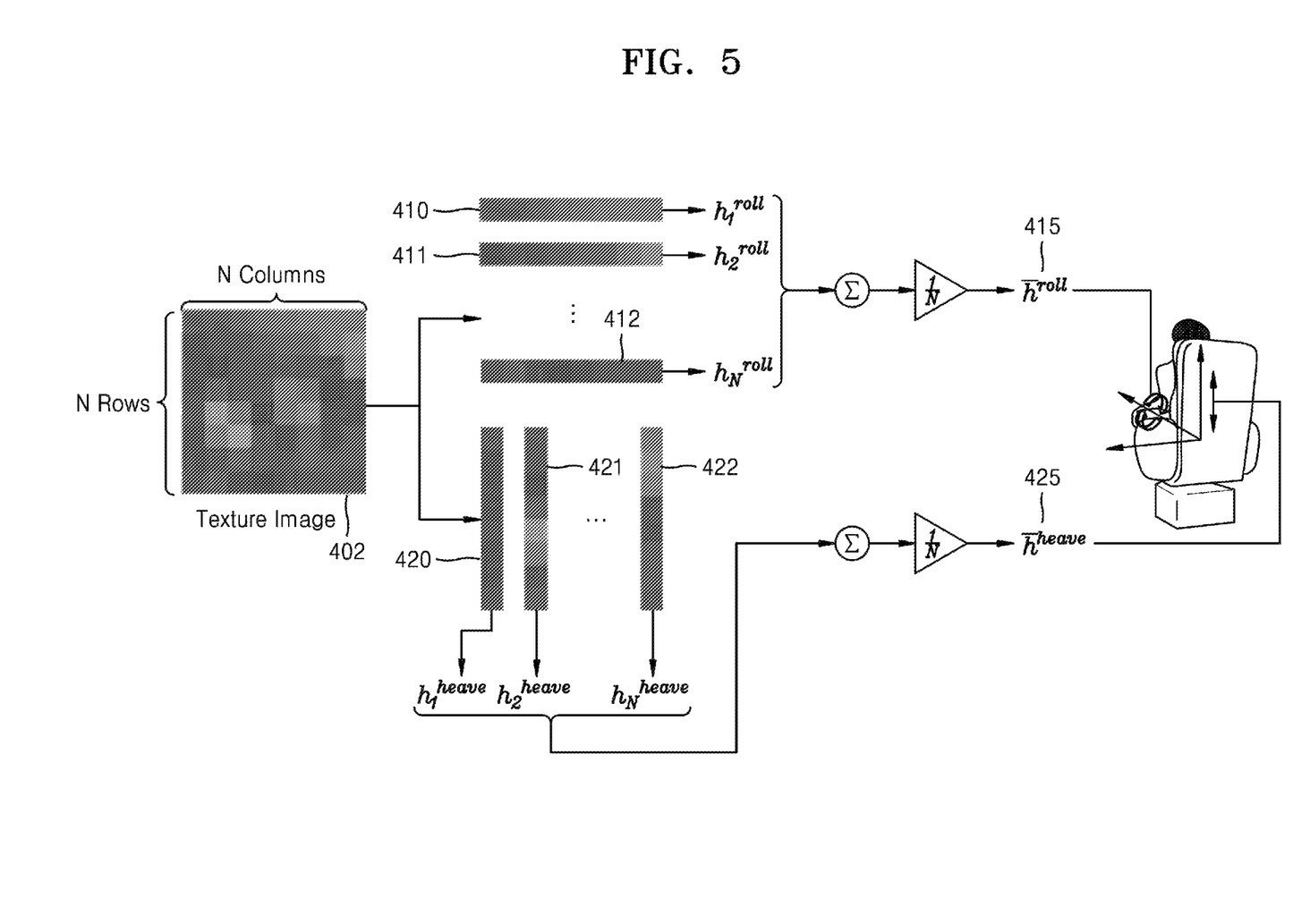
FIG. 5 illustrates a process of applying linear predictive coding (LPC) to a texture image in order to form an average prediction filter for generating a texture signal, according to an embodiment.

Referring to FIG. 5, the texture motion synthesizer 410 may separate the texture image 402 into N*N columns and rows. For example, when the texture image is 256*256 grayscale input images, N=256.

The texture motion synthesizer 410 may apply LPC to each of N rows to obtain N row LPC filters $h_1^{roll}$ 410, $h_2^{roll}$ 411, ..., and $h_N^{roll}$ 412 and may calculate an average value $\bar{h}^{roll}$ 415 of the N row LPC filters. Also, the texture motion synthesizer 410 may obtain N column LPC filters 410 $h_1^{heave}$ 420, $h_2^{heave}$ 421, ..., $h_N^{heave}$ 422 by applying LPC to each of N columns and may calculate an average value $\bar{h}^{heave}$ 425 of the N column LPC filters.

The texture motion synthesizer 410 may generate a texture signal mtexture=($m_{texture}^{roll}$, $m_{texture}^{heave}$) by using an average prediction filter. The average prediction filter may include the average value $\bar{h}^{roll}$ 415 of the N row LPC filters and the average value $\bar{h}^{heave}$ 425 of the N column prediction filters.

Equation 1 indicates the texture signal $m_{texture}^{roll}$ of the roll channel, and Equation 2 indicates the texture signal $m_{texture}^{heave}$ of the heave channel. In Equations 1 and 2, a white noise signal e[n] is used as an input for generating an arbitrary signal for containing a spectrum of the LPC prediction filter.

$$m_{texture}^{roll}[n] = e[n] + \sum_{k=1}^{p} \bar{h}^{roll}[k] m_{texture}^{roll}[n-k] \quad \text{[Equation 1]}$$

$$m_{texture}^{heave}[n] = e[n] + \sum_{k=1}^{p} \bar{h}^{heave}[k] m_{texture}^{heave}[n-k] \quad \text{[Equation 2]}$$

The bandpass filtering portion 414 may transmit the texture signal $m_{texture}^{roll}$ of the roll channel and the texture signal $m_{texture}^{heave}$ of the heave channel to a bandpass filter, and thus, may remove an excessively high frequency component that a motion platform is unable to display and may also remove a low frequency component so that a motion is converged to a neutral location. An example of the bandpass filter may include a 2nd order Butterworth bandpass filter having a low cutoff frequency of 1 Hz and a high cutoff frequency of 5 Hz.

The scaler 416 may scale the texture signal mtexture having passed through the bandpass filtering portion 414 based on a visual roughness Ra of the texture signal mtexture according to Equation 5 to thus generate a scaled texture signal mtexture'.

The visual roughness Ra may have a high correlation with a haptic and physical roughness and may be estimated according to 1-norm of a height map as shown in Equation 3.

$$R_a = E[|h(x,y) - E[h(x,y)]|] \quad \text{[Equation 3]}$$

In Equation 3, E indicates an operator with respect to an expected value. When a 2D image is used as the texture image as in the disclosure, Equation 3 may be normalized as Equation 4.

$$R_a = E[|i(x,y) - E[i(x,y)]|] \quad \text{[Equation 4]}$$

The scaler 416 may perform scaling based on the estimated visual roughness Ra.

$$m_{texture'}[n] = R_a \frac{m_{texture}[n]}{\max(m_{texture}[n])} \quad \text{[Equation 5]}$$

Figure 6:
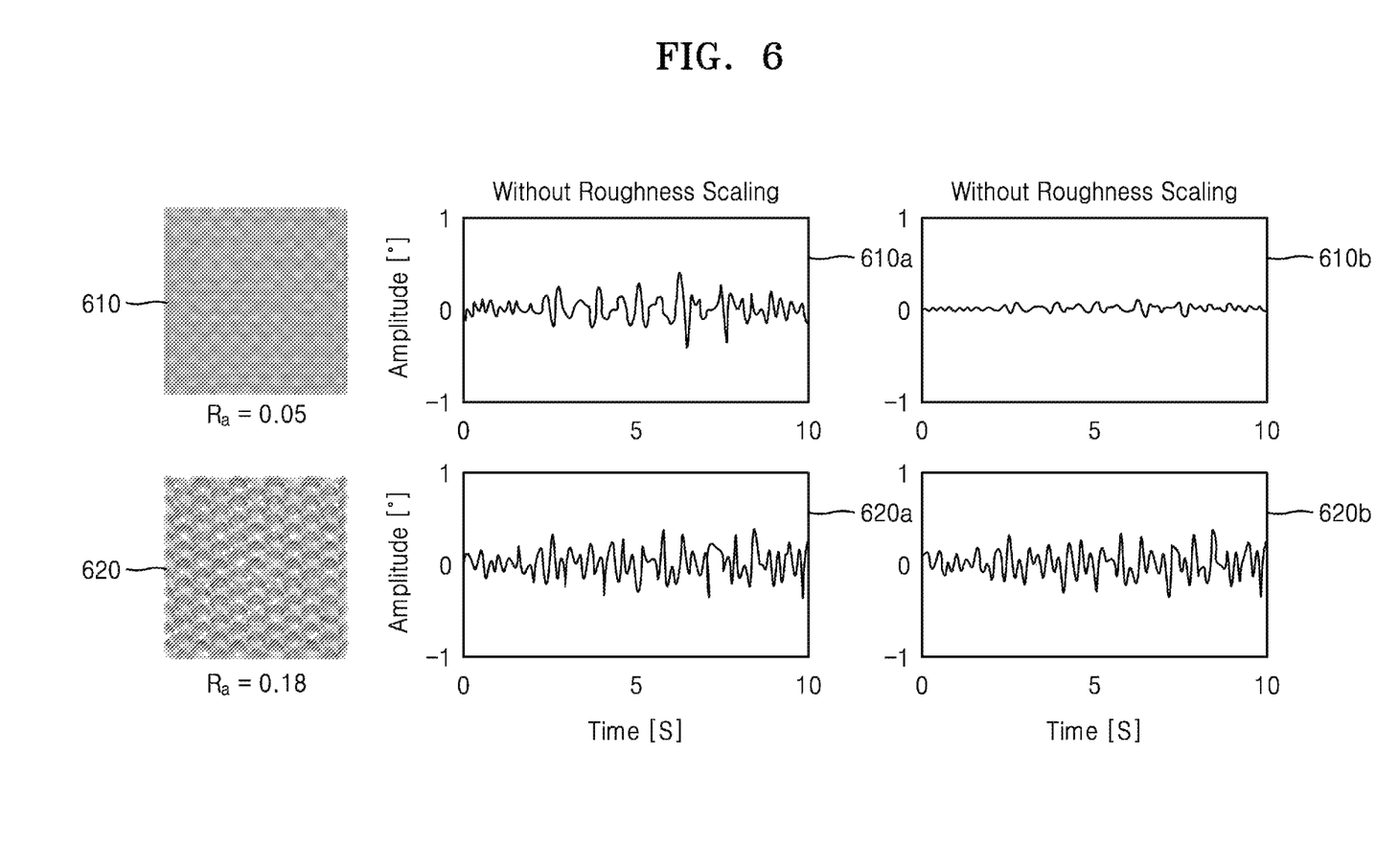
FIG. 6 illustrates an example of scaling a texture signal based on a visual roughness of the texture signal, according to an embodiment.

FIG. 6 illustrates a texture signal mtexture 610a and a scaled texture signal mtexture' 610b with respect to a texture image 610 having a visual roughness Ra of 0.05. Also, FIG. 6 illustrates a texture signal mtexture 610a and a scaled texture signal mtexture' 610b with respect to a texture image 620 having a visual roughness Ra of 0.18.

The scaler 416 may generate the texture signal with respect to the texture image 610 according to a scaling method as shown in Equation 5. For example, with respect to the texture image 610 having the visual roughness (Ra=0.05) that is less than a predetermined value, despite a large difference in magnitude between pixels, the scaler 416 may generate a texture signal having a little magnitude of a maximum amplitude of 0.05 based on the visual roughness. However, with respect to the texture image 620 having the visual roughness (Ra=0.18) that is greater than a predetermined value, the scaler 416 may generate a texture signal having a relatively great magnitude of a maximum amplitude of 0.18.

The re-sampler 418 may generate a texture motion by further reflecting a depth speed of the camera to the scaled texture signal mtexture'. For example, in the case of a vehicle driving on a bumpy road in a real situation, the vehicle may be shaken more frequently and violently as a speed of the vehicle increases. In order to implement this realistic movement, the re-sampler 418 may adjust a size of the texture motion mstyle so that the user may experience an increased degree of bumpiness of the road as a camera moves at an increased speed according to a movement speed of the vehicle in the image. For example, the re-sampler 418 may generate the texture motion such that the movement of the texture motion is reproduced at a higher speed by increasing an amplitude and decreasing a cycle, when a depth speed v(t) of the camera is 0.4 unit distances/seconds than when the depth speed v(t) of the camera is 0.2 unit distances/seconds.

According to an embodiment, the re-sampler 418 may generate the texture motion mstyle by reflecting the depth speed v(t) of the camera estimated in the input image as shown in Equation 6. In the case of a content image manufactured through a simulation engine, the depth speed information of the camera may be extracted from the simulation engine. In the case of a content image directly captured, the depth speed of the camera measured by a motion sensor when the image is captured may be used. When there is no depth speed of the camera measured by the motion sensor, a computer vision technique for tracking a location of the camera may be used to calculate the speed of the camera.

$$m_{style}(t) = Kv(t) \cdot m_{texture'}\left[\left(\frac{d(t)}{d_{interval}} \cdot L\right) \bmod L\right]$$ [Equation 6]

In Equation 6, a gain which has to be adjusted according to the motion platform is illustrated, wherein d(t) indicates a normalized distance of a camera movement, dinterval) indicates a distance of the camera movement corresponding to one cycle of the texture signal, and L indicates a length of the scaled texture signal.

$$d(t) = \frac{1}{\max v(t)} \int_0^t v(\tau) d\tau$$

According to an embodiment, K=2.5, and in order to make a temporal frequency of the texture motion correspond to a visual density of a bumpy portion of the texture image, dinterval may be set to be 3, and L may be set to be 10,000. That dinterval is 3 denotes that the texture signal is displayed once when the camera in the image moves 3 distance units.

A compensator 419 may compensate for the texture motion affected by the camera motion when the texture motion including high frequencies is merged with the camera motion including low frequencies. The texture motion effect including the high frequencies may be perceptually masked or improved by the camera motion effect including the low frequencies. That the effect is perceptually masked denotes that a magnitude less than an actual magnitude is experienced. Also, that the effect is perceptually improved denotes that a magnitude greater than an actual magnitude is experienced.

The compensator 419 may compensate for a perceptual magnitude as mstyle' by scaling the amplitude of the texture motion mstyle according to the amplitude of the camera motion, in order to reduce the interruption of the camera movement and improve the perception of the high frequency movement. In other words, the compensator 419 may perform compensation by performing scaling such that the magnitude of the texture motion perceived when the texture motion is merged with camera motion becomes the same as the magnitude perceived when the texture motion is solely presented.

According to an embodiment, the compensation of the texture motion mstyle may be selectively applied.

The camera motion synthesizer 420 may include a movement predictor 423 and a washout filtering portion 424. The movement predictor 423 may estimate the movement of the camera based on the movement of each pixel between two continual images of the image, and the washout filtering portion 424 may apply a high-frequency filter to the estimated movement of the camera and perform integration to transform the estimated movement of the camera to the camera motion. In addition, the camera motion synthesizer 420 may use a technique of synthesizing the camera motion according to the related art.

The washout filtering portion 424 may generate the camera motion by applying a motion queueing algorithm such as a washout filter to an estimated movement value of the camera in order to apply the motion queueing algorithm to reproduce the movement of the camera within a constraint condition of the motion platform.

The merged motion synthesizer 430 may synthesize the merged motion by merging the texture motion with the camera motion. The merged motion may be synthesized according to an MPC method. The multisensory media system may control the motion platform based on the merged motion.

According to an embodiment, the motion effect rendering device 400 may be implemented with respect to a 3 degrees of freedom motion platform, and may also be implemented with respect to a 2 degrees of freedom motion platform or a 6 degrees of freedom motion platform. When a roll channel and a pitch channel are used in the 2 degrees of freedom motion platform, a heave channel included in the texture motion may be replaced by the pitch channel to apply the texture motion effect. Examples of the motion effect rendering device may include a computer, a notebook computer, a smartphone, a hand-held device, a wearable device, an image-capturing device, etc.

The operation of the method according to an embodiment may be implemented by a computer-readable program or code stored in a computer-readable recording medium. The computer-readable recording medium may include all types of recording devices storing data which may be read by a computer system. The computer-readable recording medium can also be distributed over network-coupled computer systems so that the compute readable program or code may be stored and executed in a distributed fashion.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of providing a texture motion effect in a multisensory media system, the method comprising:
generating a texture signal by using linear predictive coding (LPC) filters obtained by applying LPC to each of a column and a row forming a texture image selected from an input image;
generating a texture motion by using a visual roughness of the texture signal and a depth speed of a camera; and
generating a merged motion by merging a camera motion synchronized with a camera movement of the input image with the texture motion,
wherein the merged motion is synthesized according to a model prediction control (MPC) method, the method further comprising controlling a motion platform based on the merged motion.

2. The method of claim 1, wherein the input image is a point of view (POV) shot.

3. The method of claim 1, wherein a high frequency component that the motion platform is unable to display is removed from the texture signal by using a bandpass filter.

4. The method of claim 1, wherein the column is mapped to a heave channel, and the row is mapped to a roll channel.

5. A motion effect rendering device comprising:
    a linear predictive coding (LPC) applier configured to obtain LPC filters by applying LPC to each of a column and a row forming a texture image selected from an input image;
    a bandpass filtering portion configured to remove a high frequency component of a texture signal generated by using the LPC filters;
    a scaler configured to scale the texture signal based on a visual roughness of the texture signal; and
    a re-sampler configured to generate a texture motion by using the scaled texture signal and a depth speed of a camera.

6. The motion effect rendering device of claim 5, further comprising a compensator configured to compensate for a perceptual magnitude by scaling an amplitude of the texture motion.

7. The motion effect rendering device of claim 5, further comprising a merged motion synthesizer configured to generate a merged motion by merging a camera motion synchronized with a camera movement of the input image with the texture motion.

8. The motion effect rendering device of claim 7, wherein the merged motion is synthesized according to a model prediction control (MPC) method, and a motion platform is controlled based on the merged motion.

9. The motion effect rendering device of claim 5, wherein the input image is a point of view (POV) shot.

10. The motion effect rendering device of claim 5, wherein the column is mapped to a heave channel, and the row is mapped to a roll channel.

11. A method of providing a texture motion effect in a multisensory media system, the method comprising:
    generating a camera motion synchronized with a movement of a camera of an input image;
    selecting a texture image from a scene to which a texture motion effect is to be added;
    generating a texture signal by using linear predictive coding (LPC) filters obtained by applying LPC to each of a column and a row forming the texture image;
    generating a texture motion by using a visual roughness of the texture signal and a depth speed of the camera; and
    generating a merged motion by merging the camera motion with the texture motion according to a model prediction control (MPC) method.

12. The method of claim 11, wherein the generating of the merged motion includes merging the camera motion with the texture motion after compensating for a perceptual magnitude by scaling an amplitude of the texture motion.

13. A non-transitory computer-readable recording medium for implementing a program of the method of providing the texture motion effect in the multisensory media system of claim 1.

* * * * *